(12) United States Patent  
Tapaninen

(10) Patent No.: US 8,781,613 B1  
(45) Date of Patent: Jul. 15, 2014

(54) AUDIO APPARATUS FOR PORTABLE DEVICES

(71) Applicant: Applifier OY, Helsinki (FI)

(72) Inventor: Antti Tapaninen, Helsinki (FI)

(73) Assignee: Applifier Oy, Helsinki (FI)

( * ) Notice: Subject to any disclaimer, the term of this patent is extended or adjusted under 35 U.S.C. 154(b) by 0 days.

(21) Appl. No.: 13/927,557

(22) Filed: Jun. 26, 2013

(51) Int. Cl.
*G06F 17/00* (2006.01)
*G06F 3/00* (2006.01)
*G06F 7/38* (2006.01)

(52) U.S. Cl.
USPC .............. 700/94; 719/322; 719/328; 712/226

(58) Field of Classification Search
CPC ....... G06F 3/0631; G06F 3/162; G06F 3/165; G06F 9/54; H04M 1/72522; H04M 1/72558; H04M 1/656; H04M 1/72563
USPC ............. 700/94; 710/5, 49, 74; 712/220, 224, 712/225, 226, 227; 719/320, 322, 328, 331; 717/168, 170
See application file for complete search history.

(56) References Cited

U.S. PATENT DOCUMENTS

| 5,410,698 | A | 4/1995 | Danneels et al. |
| 5,699,275 | A | 12/1997 | Beasley et al. |
| 6,405,171 | B1 | 6/2002 | Kelley |
| 6,405,255 | B1 * | 6/2002 | Stoltz et al. .................... 719/322 |
| 7,171,674 | B2 | 1/2007 | Arrouye et al. |
| 7,801,931 | B2 | 9/2010 | Tunar et al. |
| 8,416,184 | B2 * | 4/2013 | Morotomi et al. ............. 345/156 |
| 2005/0108692 | A1 * | 5/2005 | Lau et al. ....................... 717/136 |
| 2012/0134480 | A1 * | 5/2012 | Leeds et al. ................ 379/88.12 |

FOREIGN PATENT DOCUMENTS

WO 2013006226 A1 1/2013

OTHER PUBLICATIONS

"Intel IPP-Open Source Computer Vision Library"; Intel Software; Intel IPP-Open Source Computer Vision Library (OpenCV) FAQ | Intel Developer Zone; Mar. 25, 2012.

* cited by examiner

*Primary Examiner* — Jesse Elbin
(74) *Attorney, Agent, or Firm* — Ziegler IP Law Group, LLC.

(57) ABSTRACT

An audio apparatus for a portable device is provided. The portable device includes computing hardware coupled to associated data memory, which stores one or more audio or computer program products that include a plurality of audio libraries. The audio apparatus is operable to execute the audio products upon the computing hardware, whereby the audio products are operable to call the audio libraries to generate digital audio data. The digital audio data so generated is provided to sound-generating hardware, which is then operable to generate acoustic audio signals corresponding to the digital audio data. The audio apparatus is operable to host one or more replacement audio products, which are storable in the data memory. The audio apparatus is operable to invoke the replacement audio products as an alternative to the audio products for generating the digital audio data. The replacement audio products are operable to provide a functionality of capturing the digital audio data while substantially generating the acoustic audio signals.

20 Claims, 4 Drawing Sheets

AUDIO APPARATUS FOR PORTABLE DEVICES

CROSS-REFERENCE TO RELATED APPLICATION(S)

This application is related to U.S. patent application Ser. No. 13/765,703 filed on 13 Feb. 2013 entitled "System and Method for Sharing Gameplay Experiences" and incorporated by reference in its entirety; U.S. patent application Ser. No. 13/765,705 filed on 13 Feb. 2013 entitled "System and Method for Sharing Score Experiences" and incorporated by reference in its entirety; and U.S. patent application Ser. No. 13/765,708 filed on 13 Feb. 2013 entitled "System and Method for Managing Game-Playing Experiences" and incorporated by reference in its entirety.

FIELD

The aspects of the present disclosure generally relate to audio apparatus for portable devices, and more specifically, to an audio apparatus that is operable to provide a functionality of capturing digital audio data. Moreover, the aspects of the present disclosure relate to a method of operating the audio apparatus thereof. Furthermore, the aspects of the present disclosure also relate to a software or computer program product including computer readable code means stored on non-transitory machine-readable data storage media, wherein the software or computer program product is executable upon computing hardware to implement the aforesaid method.

BACKGROUND

Various operating systems (OS) and audio apparatus have been developed to support portable devices that we see today. Typically, an audio apparatus for a portable device includes one or more High Level Audio Libraries (HLALs) and/or one or more Low Level Audio Libraries (LLALs). These audio libraries can be called by various applications running on an OS of the portable device, to generate human-audible sounds. The HLALs provide a wide variety of audio generation tools, for example, such as music playback. On the other hand, the LLALs provide various ways to generate and manipulate audio, depending on inputs provided by a user via a direct manipulation interface.

FIG. 1 (Prior Art) is a schematic illustration of a conventional audio apparatus for a portable device. The conventional audio apparatus includes an audio engine 102, an HLAL 104, an LLAL 106, an audio driver 108, an audio adapter 110, and an audio endpoint 112. The audio engine 102 may reside in an OS space, as shown in FIG. 1. The audio driver 108 may be software-enabled in a kernel. The audio driver 108 is interfaced with the audio endpoint 112 through the audio adapter 110. The audio adapter 110 may be hardware, such as a plug or a bus, while the audio endpoint 112 may be hardware, such as a speaker or a headphone.

Let us consider, for example, that an application (not shown in FIG. 1) is running on an OS of the portable device. The application may, for example, be a gaming application that may require generation of human-audible sounds during playing of a game. Let us also consider that the application calls the audio engine 102 to generate human-audible sounds via the conventional audio apparatus. In some cases, the audio engine 102 may be a part of the application itself.

Depending on type of audio processing to be performed, the audio engine 102 may:

(a) call the LLAL 106 directly, or (b) call the HLAL 104, which may then generate instructions for producing digital audio data, and call the LLAL 106.

Subsequently, the LLAL 106 may generate, modify or pass through the digital audio data to the audio driver 108. Consequently, the audio driver 108 controls the audio adapter 110 and/or the audio endpoint 112 to generate acoustic audio signals corresponding to the digital audio data.

The audio engine 102 acts as an interface between the application and the audio apparatus. Optionally, the audio engine 102 could simply be a routine of the application calling the HLAL 104 or the LLAL 106. Alternatively, the audio engine 102 could be a full-featured sub-program of the application responsible for one or more of:

(a) reading and/or writing the digital audio data, (b) performing Digital Signal Processing (DSP) on the digital audio data, and/or (c) mixing multiple streams of the digital audio data into a single audio stream to be rendered into human-audible sounds.

The audio engine 102 may be either created by an author of the application, or licensed from a third party. In many instances, the audio engine 102 may not provide any interface to capture the digital audio data generated by the conventional audio apparatus.

Conventional techniques for facilitating such audio capturing require modifying the application and/or the audio engine 102 to include audio capturing capabilities. For this purpose, an additional software module has to be included as a part of the application. In addition, the audio engine 102 has to be modified to call the additional software module to capture audio during the execution of the application.

However, these conventional techniques suffer from a number of disadvantages. Firstly, the application and/or the audio engine 102 are required to be modified extensively. Secondly, making such extensive modifications is difficult, time consuming and tedious. Thirdly, in instances where the audio engine 102 is licensed from a third party, source code of the audio engine 102 is often closed, and, therefore, cannot be modified by the author of the application. Fourthly, the additional software module has to be executed upon computing hardware of the portable device during the execution of the HLAL 104 and/or the LLAL 106. This leads to potential performance degradation of the application.

Therefore, there exists a need for an audio apparatus for a portable device that is capable of facilitating audio capturing in a transparent manner.

SUMMARY

The aspects of the present disclosure seek to provide an audio apparatus for a portable device.

The aspects of the present disclosure also seek to provide an audio apparatus that is operable to provide a functionality of capturing digital audio data.

The aspects of the present disclosure also seek to provide a method of operating an audio apparatus thereof.

In one aspect, embodiments of the present disclosure provide an audio apparatus for a portable device. Examples of the portable device include, but are not limited to, a mobile terminal, a mobile telephone, a smart phone, a Mobile Internet Device (MID), a phablet computer, a tablet computer, an Ultra-Mobile Personal Computer (UMPC), a Personal Digital Assistant (PDA), a web pad, a handheld personal computer, a laptop computer, an interactive entertainment computer, and a gaming terminal.

The portable device includes computing hardware, such as a controller or processor, coupled to associated data memory, which stores one or more audio software modules and products generally in the form of computer readable code means that include a plurality of audio libraries. When an application, such as a gaming application, requires generation of acoustic audio signals, the audio apparatus executes the audio software products upon the computing hardware. Consequently, the audio software modules and products call the audio libraries to generate digital audio data. The digital audio data so generated is provided to sound-generating hardware, which then generates acoustic audio signals corresponding to the digital audio data.

The sound-generating hardware may include at least one audio driver and/or at least one audio adapter coupled to at least one audio endpoint of the portable device for generating the acoustic audio signals. The at least one audio driver and/or the at least one audio adapter may be operable to process the digital audio data.

Let us consider an example scenario in which the audio software products are proprietary software, which are configured in a manner that hinders using the audio software products to capture the digital audio data generated by the audio apparatus.

In order to capture the digital audio data, the audio apparatus is operable to host one or more replacement software products, which are storable in the data memory. The audio apparatus is operable to invoke the replacement software products as an alternative to the audio software products for generating the digital audio data. Thereafter, the replacement software products are operable to provide a functionality of capturing the digital audio data whilst substantially generating the acoustic audio signals.

The audio software modules and products may, for example, include a High Level Audio Library (HLAL) and a Low Level Audio Library (LLAL). The HLAL may be operable to generate instructions for producing the digital audio data, and to send the digital audio data and/or the instructions to the LLAL. Subsequently, the LLAL may be operable to generate or modify or pass through the digital audio data to the sound-generating hardware to generate the acoustic audio signals.

On the other hand, the replacement software modules and products may include a Replacement High Level Audio Library (RHLAL) and/or a Wrapper Library (WL). The RHLAL may be operable to provide Application Programming Interfaces (APIs) that are substantially similar to APIs of the HLAL, while the WL may be operable to override function calls to the LLAL to pass through the WL.

The RHAL and/or the WL may be simply included in an Application Binary Interface (ABI) of the application, for example, when the application is linked together with object code libraries. Such linking may, for example, be performed when an executable file is created, or whenever the application is used at run time.

In addition, the replacement software modules and products may include an audio capture component for capturing the digital audio data. The digital audio data so captured may then be stored in the data memory coupled to the computing hardware and/or be used to regenerate acoustic audio signals by the sound-generating hardware.

In another aspect, embodiments of the present disclosure provide a method of operating the audio apparatus for the portable device.

In yet another aspect, embodiments of the present disclosure provide a software or computer program product including computer readable program code means stored on non-transitory machine-readable data storage media, wherein the software or computer program product is executable upon computing hardware of the portable device for implementing the aforementioned method. The software or computer program product may, for example, be downloadable from a software application store to the portable device.

Embodiments of the present disclosure substantially eliminate the aforementioned problems in the prior art, and enable users to capture digital audio data generated during game-playing, without degrading performance of their portable devices, and facilitate the functionality of capturing the digital audio data, without any requirement to modify applications and/or audio engines, apart from simply including the RHAL and/or the WL in the ABI of the application.

Additional aspects, advantages, features and aspects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the aspects of the present disclosure, exemplary constructions of the disclosure are shown in the drawings. However, the aspects of the present disclosure are not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

Figure 1:
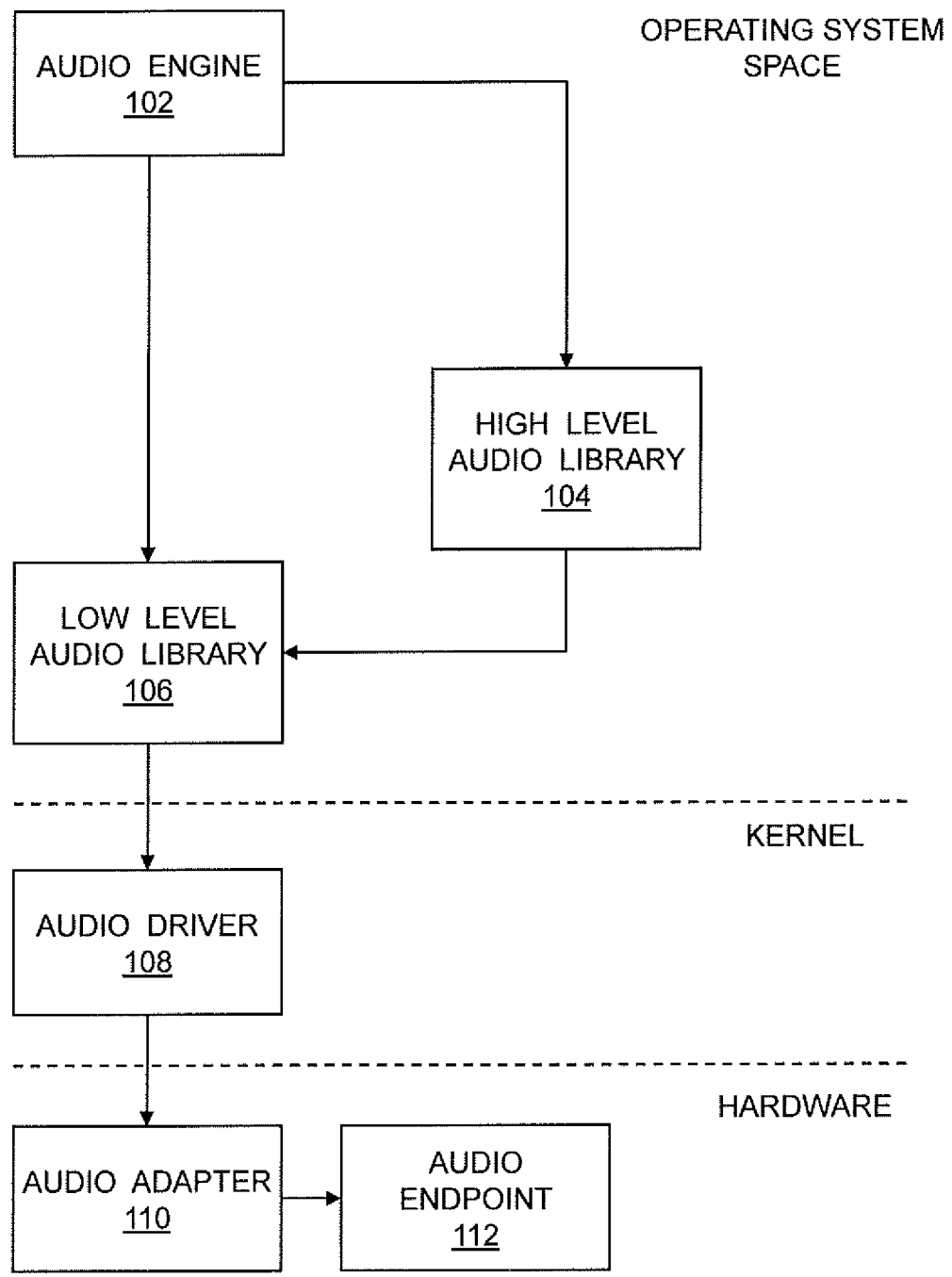
FIG. 1 (Prior Art) is a schematic illustration of a conventional audio apparatus for a portable device.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS OF THE DISCLOSURE

The following detailed description illustrates embodiments of the present disclosure and ways in which it can be implemented. Although the best mode of carrying out the present disclosure has been disclosed, those in the art would recognize that other embodiments for carrying out or practicing the aspects of the present disclosure are also possible.

Embodiments of the present disclosure provide an audio apparatus for a portable device. Examples of the portable device include, but are not limited to, a mobile terminal, a mobile telephone, a smart phone, a Mobile Internet Device (MID), a phablet computer, a tablet computer, an Ultra-Mobile Personal Computer (UMPC), a Personal Digital Assistant (PDA), a web pad, a handheld personal computer, a laptop computer, an interactive entertainment computer, and a gaming terminal.

The portable device includes computing hardware coupled to associated data memory, which stores one or more audio products and modules, such as software and computer program products that include a plurality of audio libraries. In one embodiment, the software products and modules comprise computer program products including computer readable program code means, the computer readable program code means being stored on a computer readable storage medium for carrying out and executing the processes and instructions described herein. In one embodiment, the audio apparatus is operable to execute the audio software products upon the computing hardware, whereby the audio software products are operable to call the audio libraries to generate digital audio data. The digital audio data so generated is provided to sound-generating hardware, which is then operable to generate acoustic audio signals corresponding to the digital audio data.

The sound-generating hardware may include at least one audio driver and/or at least one audio adapter coupled to at least one audio endpoint of the portable device for generating the acoustic audio signals. The at least one audio driver and/or the at least one audio adapter may be operable to process the digital audio data.

Additionally, there could be scenarios where a sound is captured from a microphone of the portable device to generate digital audio data for capturing in the data memory, whilst other digital audio data is being generated by the audio engine to generate acoustic audio signals from a loudspeaker of the portable device and to be captured in the data memory.

Let us consider an example scenario in which the audio software products are proprietary software, which are configured in a manner that hinders using the audio software products to capture the digital audio data generated by the audio apparatus.

In order to capture the digital audio data, the audio apparatus is operable to host one or more replacement audio products and devices, such as software and computer program products, which are storable in the data memory. The audio apparatus is operable to invoke the replacement software products as an alternative to the audio software products for generating the digital audio data. Thereafter, the replacement software products are operable to provide a functionality of capturing the digital audio data, whilst substantially generating the acoustic audio signals.

The audio products may, for example, include a High Level Audio Library (HLAL) and a Low Level Audio Library (LLAL). The HLAL may be operable to generate instructions for producing the digital audio data, and to send the digital audio data and/or the instructions to the LLAL. Subsequently, the LLAL may be operable to generate or modify or pass through the digital audio data to the sound-generating hardware to generate the acoustic audio signals.

On the other hand, the replacement software products may include a Replacement High Level Audio Library (RHLAL) and a Wrapper Library (WL). The RHLAL may be operable to provide Application Programming Interfaces (APIs) that are substantially similar to APIs of the HLAL, while the WL may be operable to override function calls to the LLAL to pass through the WL.

In addition, the replacement software products may include an audio capture component for capturing the digital audio data, during the generation of the acoustic audio signals. The digital audio data so captured may then be stored in the data memory coupled to the computing hardware and/or be used to regenerate acoustic audio signals by the sound-generating hardware.

Figure 2:
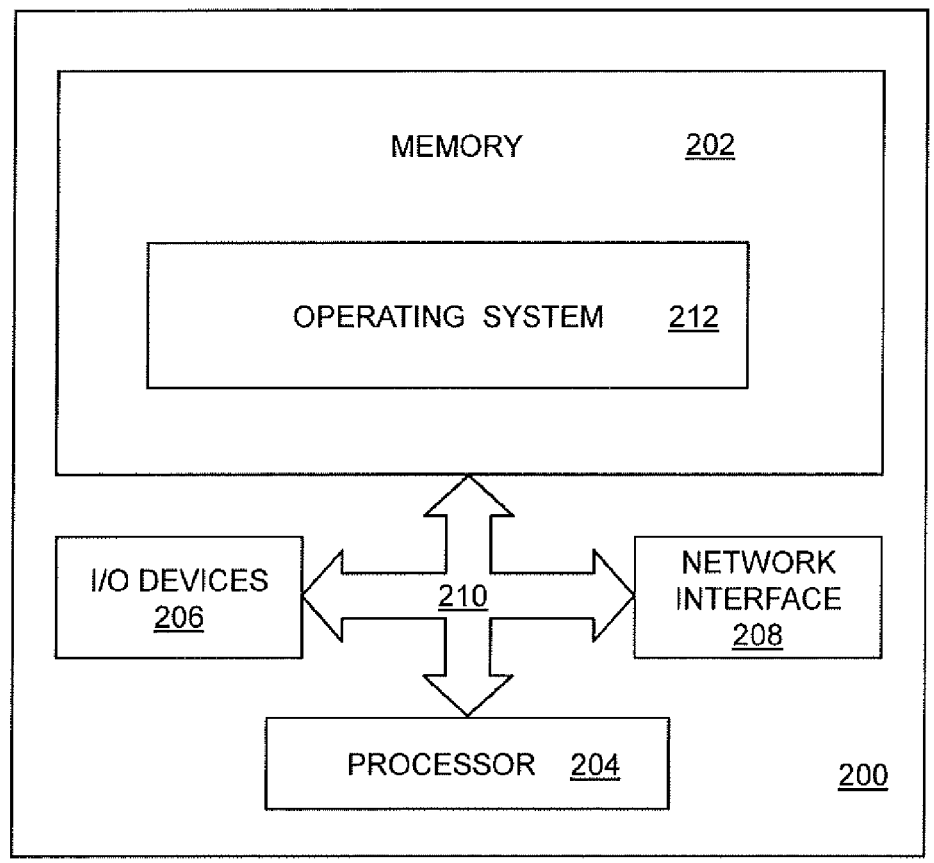
FIG. 2 is a schematic illustration of a portable device that may be suitable for implementing an audio apparatus, in accordance with an embodiment of the present disclosure.

Referring now to the drawings, particularly by their reference numbers, FIG. 2 is a schematic illustration of various components of a portable device 200 that may be suitable for implementing an audio apparatus, in accordance with an embodiment of the present invention. The portable device 200 includes, but is not limited to, a memory 202, computing hardware such as a processor 204, Input/Output (I/O) devices 206, a network interface 208, and a system bus 210 that operatively couples various components including the memory 202, processor 204, the I/O devices 206 and the network interface 208.

The memory 202 may include non-removable memory, removable memory, or a combination thereof. The non-removable memory may, for example, include Random-Access Memory (RAM), Read-Only Memory (ROM), flash memory, or a hard drive. The removable memory may, for example, include flash memory cards, memory sticks, or smart cards.

The memory 202 stores an Operating System (OS) 212 that, when executed on processor 204, provides an interface on which various applications may be run. In addition, the OS 212 may include a user interface (not shown in FIG. 2) that provides a user of the portable device 200 with one or more options to choose amongst.

For example, the user interface may allow the user to download a gaming application from a remote server, and play a game by executing the gaming application. In addition, the user may be provided an option to capture digital audio data generated during playing of the game. Details of how the digital audio data may be captured have been provided in conjunction with FIG. 3. The digital audio data so captured may then be stored in the memory 202.

In addition, the captured digital audio data may be shared with other users using other portable devices via the network interface 208. The network interface 208 may allow the portable device 200 to communicate with other portable devices, for example, via a communication network (not shown in FIG. 2). In addition, the network interface 208 may allow the portable device 200 to upload the captured digital audio data to the remote server, over the communication network.

The communication network can be a collection of individual networks, interconnected with each other and functioning as a single large network. Such individual networks may be wired, wireless, or a combination thereof. Examples of such individual networks include, but are not limited to, Local Area Networks (LANs), Wide Area Networks (WANs), Metropolitan Area Networks (MANs), Wireless LANs (WLANs), Wireless WANs (WWANs), and Wireless MANs (WMANs).

The portable device 200 may be implemented by way of at least one of: a mobile terminal, a mobile telephone, a smart phone, an MID, a phablet computer, a tablet computer, a UMPC, a PDA, a web pad, a handheld personal computer, a laptop computer, an interactive entertainment computer, and a gaming terminal.

FIG. 2 is merely an example, which should not unduly limit the scope of the claims herein. It is to be understood that the specific designation for the portable device 200 is for the convenience of reader and is not to be construed as limiting the portable device 200 to specific numbers, types, or arrangements of modules and/or components of the portable device 200. One of ordinary skill in the art would recognize many variations, alternatives, and modifications of embodiments of the present invention.

Figure 3:
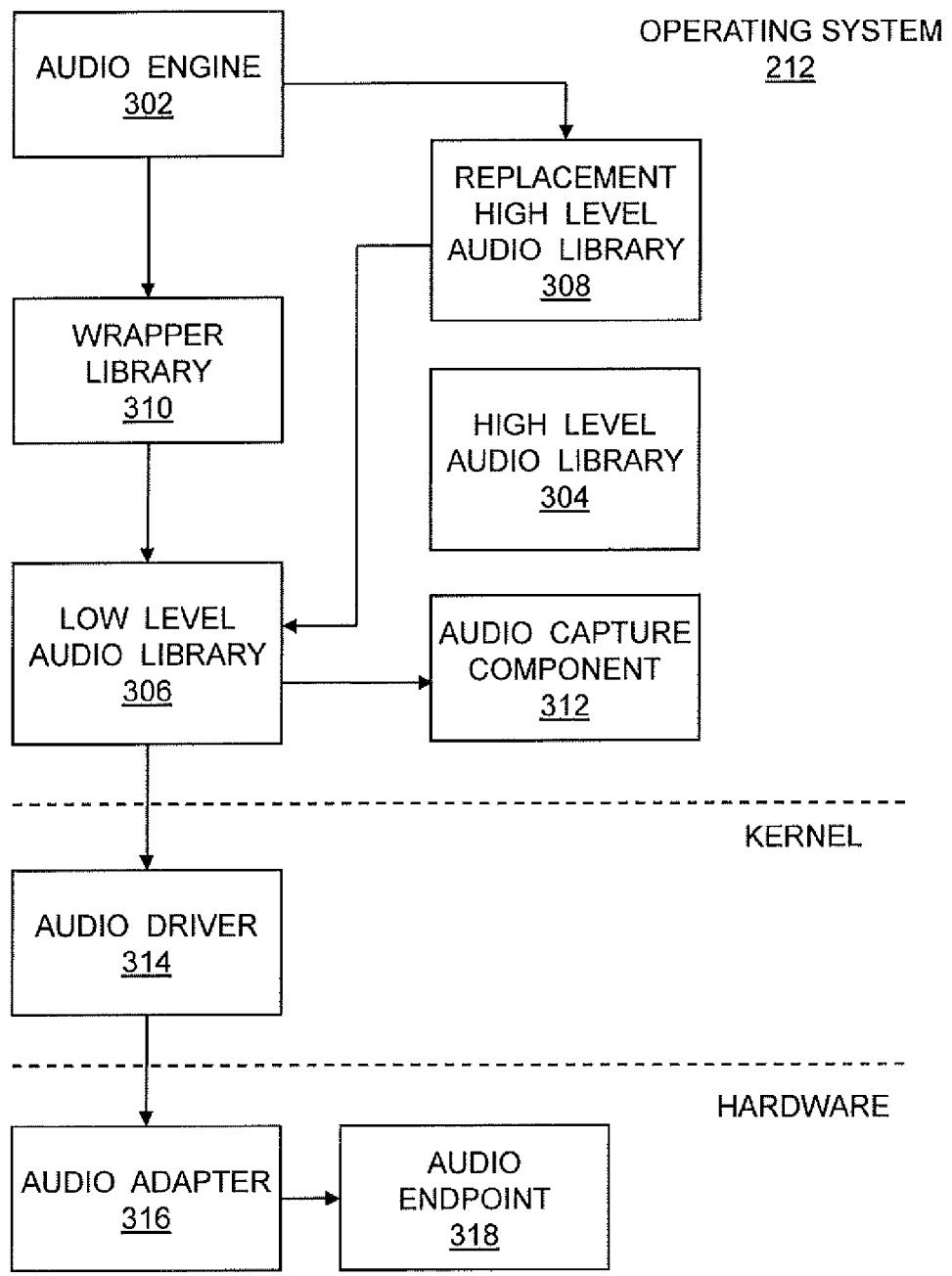
FIG. 3 is a schematic illustration of an audio apparatus for the portable device, in accordance with an embodiment of the present disclosure.

FIG. 3 is a schematic illustration of an audio apparatus for the portable device 200, in accordance with an embodiment of the present invention. The audio apparatus includes an audio engine 302, one or more audio software products or modules including an HLAL 304 and an LLAL 306, and one or more replacement software products including an RHLAL 308, a WL 310 and an audio capture component 312. In one embodiment, the software products or modules comprise computer program products including computer readable program code means. The computer readable program code means can comprise machine readable instructions, that when executed on computer hardware such as a processor, are configured to execute the process steps described herein. The audio engine 302, the HLAL 304, the LLAL 306, the RHLAL 308, the WL 310 and the audio capture component 312 are stored in the memory 202, and reside in the OS 212, as shown in FIG. 3.

For example, the audio engine 302 may be a cross-platform audio engine, such as FMOD audio engine, Irrlicht audio engine, Beatnik audio engine and the like. The HLAL 304 may be implemented via cross-platform audio APIs, such as Open Audio Library (OpenAL) API, AV Foundation framework API, CocosDenshion API and the like. The LLAL 306 may, for example, be implemented via Core Audio API, DirectX Audio API and the like.

In addition, the audio apparatus includes sound-generating hardware that includes an audio driver 314 and an audio adapter 316 coupled to an audio endpoint 318. The audio driver 314 may be software-enabled in a kernel. The audio driver 314 may be a system-supplied driver component, a vendor-supplied driver component, or a combination thereof. The audio driver 314 is interfaced with the audio endpoint 318 through the audio adapter 316. The audio adapter 316 may be hardware, such as a plug or a bus, while the audio endpoint 318 may be hardware, such as a speaker or a headphone.

Let us consider, for example, that an application (not shown in FIG. 3) is running on the OS 212 of the portable device 200. The application may, for example, be a gaming application that may require generation of acoustic audio signals during playing of a game. Let us also consider that the application calls the audio engine 302 to generate the acoustic audio signals. The audio engine 302 acts as an interface between the application and the audio apparatus.

It may be noted here that the audio engine 302 may optionally be implemented, at least in part, in the application. Alternatively, the audio engine 302 may be implemented as an entirely separate routine from the application. The audio engine 302 may be either created by an author of the application, or licensed from a third party.

Upon being called by the application, the audio engine 302 calls the HLAL 304 or the LLAL 306. In a case where the HLAL 304 is called, the HLAL 304 may be operable to generate instructions for producing digital audio data and to send the instructions to the LLAL 306 to generate the digital audio data for the sound-generating hardware. The audio driver 314 and/or the audio adapter 316 may then be operable to process the digital audio data, and generate the acoustic audio signals corresponding to the digital audio data via the audio endpoint 318.

Let us consider an example scenario in which the audio software products are proprietary software, which are configured in a manner that hinders using the audio software products to capture the digital audio data generated by the audio apparatus. Let us also consider that the user of the portable device 200 opts to capture the digital audio data generated during playing of the game.

In order to capture the digital audio data, the audio apparatus is operable to host the replacement software products including the RHLAL 308 and the WL 310, and to invoke the replacement software products as an alternative to the audio software products for generating the digital audio data.

Upon being invoked, the RHLAL 308 is operable to provide APIs that are substantially similar to APIs of the HLAL 304. Consequently, the RHLAL 308 may be capable of generating acoustic audio signals that are substantially human-audibly similar to acoustic audio signals generated by the HLAL 304. In this manner, the RHLAL 308 transparently replaces the HLAL 304, such that function calls originally intended for the HLAL 304 are received by the RHLAL 308.

In addition, the WL 310 is operable to override function calls to the LLAL 306 to pass through the WL 310. In this manner, the WL 310 transparently wraps around the LLAL 306, such that function calls originally intended for the LLAL 306 are received by the WL 310 before being passed by the WL 310 to the LLAL 306. This enables the WL 310 to configure the LLAL 306 to send the generated digital audio data to the audio capture component 312, thereby facilitating capturing of the digital audio data generated by the LLAL 306.

In addition, the RHLAL 308 and/or the WL 310 may be included in an Application Binary Interface (ABI) of the application, for example, when the application is linked together with object code libraries. Such linking may, for example, be performed when an executable file is created, or whenever the application is used at run time. Consequently, the RHLAL 308 and/or the WL 310 may become a part of the application, for example, as implemented by software developers.

Now, when the application calls the audio engine 302 to generate the acoustic audio signals, the audio engine 302, intending to call the HLAL 304 or the LLAL 306, instead transparently calls the RHLAL 308 or the WL 310, depending on the type of audio processing to be performed and/or one or more characteristics of the digital audio data to be generated.

In a first case where the RHLAL 308 is called and executed on the computing hardware, the RHLAL 308 is operable to provide instructions to the LLAL 306 to generate or modify or pass through the digital audio data to the sound-generating hardware. The RHLAL 308 configures the LLAL 306 to send the generated digital audio data to the audio capture component 312, thereby facilitating capturing of the digital audio data generated by the LLAL 306.

The execution of the RHLAL 308 does not lead to measurable performance degradation, as the RHLAL 308 replaces the HLAL 304.

In a second case where the WL 310 is called and executed on the computing hardware, the WL 310 is operable to call the LLAL 306 to generate the digital audio data. Additionally, the WL 310 is operable to provide instructions to LLAL 306 to send the generated digital audio data to the audio capture component 312, thereby facilitating capturing of the digital audio data generated by the LLAL 306.

In addition, the WL 310 does not lead to performance degradation, as the WL 310 does not generate the digital audio data.

It may be noted here that the audio capture component 312 may beneficially be implemented within the replacement software products. Alternatively, the audio capture component 312 may be implemented entirely separately from the replacement software products.

Beneficially, the audio capture component 312 may be operable to capture the digital audio data during the generation of the acoustic audio signals by the audio apparatus. The audio capture component 312 may also be operable to store the captured digital audio data in the memory 202. The digital audio data may then be used to regenerate acoustic audio signals by the sound-generating hardware at a later time.

Additionally, there could be scenarios where a sound is captured from a microphone of the portable device 200 to generate digital audio data for capturing in the memory 202, whilst other digital audio data is being generated by the audio engine 302 to generate acoustic audio signals from a loudspeaker of the portable device 200 and to be captured in the memory 202.

It may be noted here that the application, the audio engine 302, the HLAL 304 or the LLAL 306 are not required to be modified. As described earlier, the RHLAL 308 and/or the WL 310 are linked to the application, thereby transparently replacing the HLAL 304 and/or wrapping around the LLAL 306. This results in the audio engine 302 calling the RHLAL 308 and/or the WL 310, instead of the HLAL 304 or the LLAL 306, when required.

FIG. 3 is merely an example, which should not unduly limit the scope of the claims herein. It is to be understood that the specific designation for the audio apparatus is for the convenience of reader and is not to be construed as limiting the audio apparatus to specific numbers, types, or arrangements of modules, routines, software products, components and/or APIs of the audio apparatus. One of ordinary skill in the art would recognize many variations, alternatives, and modifications of embodiments of the present invention.

For example, a video apparatus could be implemented on the portable device 200 in a manner similar to the audio apparatus, to capture digital video data generated during the playing of the game. The digital video data so captured could then be uploaded to a remote server and/or shared with other users, as described earlier.

Figure 4:
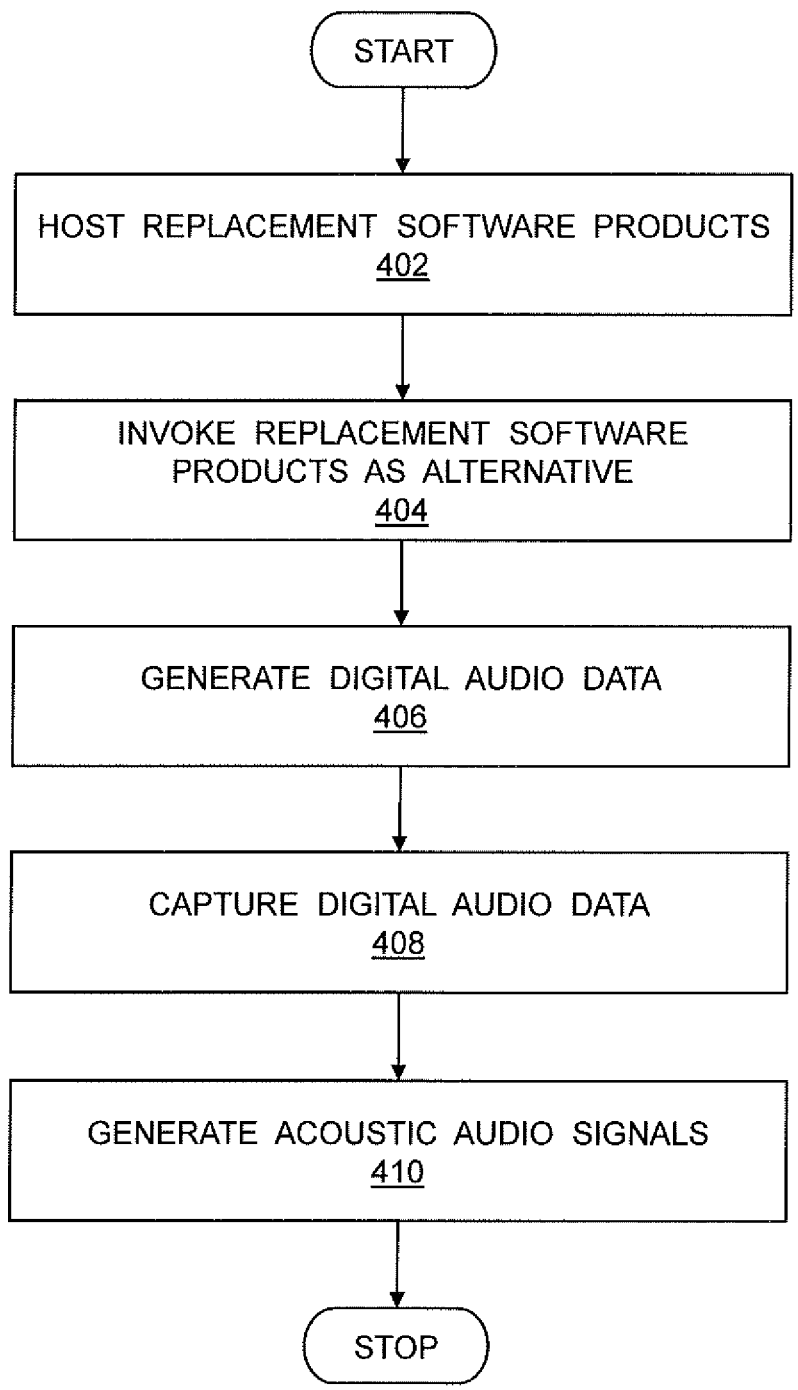
FIG. 4 is an illustration of steps of a method of operating the audio apparatus, in accordance with an embodiment of the present disclosure.

FIG. 4 is an illustration of steps of a method of operating the audio apparatus, in accordance with an embodiment of the present invention. The method is depicted as a collection of steps in a logical flow diagram, which represents a sequence of steps that can be implemented in hardware, software, or a combination thereof, such as machine-readable instructions that are executable in a processor device.

As described earlier, the audio apparatus includes the audio software products, which includes the HLAL 304 and/or the LLAL 306. Let us consider the previous example scenario in which the audio software products are proprietary software that are configured in a manner that hinders using the audio software products to capture digital audio data generated by the audio apparatus.

In order to capture the digital audio data, the audio apparatus is used to host the replacement software products, at a step 402. In accordance with the step 402, the replacement software products include the RHLAL 308 and/or the WL 310 along with the audio capture component 312. As described earlier, these replacement software products may be optionally linked to the application to become a part thereof.

For illustration purposes, let us consider that the application calls the audio engine 302 to generate the acoustic audio signals. Consequently, at a step 404, the audio apparatus operates to invoke the replacement software products as an alternative to the audio software products for generating the digital audio data.

As described earlier, the RHLAL 308 is operable to provide APIs that are substantially similar to APIs of the HLAL 304. The RHLAL 308 transparently replaces the HLAL 304, such that function calls originally intended for the HLAL 304 may be received by the RHLAL 308.

In addition, the WL 310 is operable to override function calls to the LLAL 306 to pass through the WL 310. The WL 310 transparently wraps around the LLAL 306, such that function calls originally intended for the LLAL 306 may be received by the WL 310.

In accordance with the step 404, the audio engine 302 calls the RHLAL 308 or the WL 310, depending on type of audio processing to be performed and/or one or more characteristics of the digital audio data to be generated.

Next, at a step 406, the digital audio data is generated as described below.

If, at the step 404, the RHLAL 308 is called, the RHLAL 308 operates to provide instructions to the LLAL 306 to generate or modify or pass through the digital audio data to the sound-generating hardware, at the step 406. Additionally, the RHLAL 308 operates to configure the LLAL 306 to send the digital audio data generated at the step 406 to the audio capture component 312.

If, at the step 404, the WL 310 is called, the WL 310 operates to call the LLAL 306 to generate or pass through the digital audio data to the sound-generating hardware, at the step 406. Additionally, the WL 310 operates to configure the LLAL 306 to send the digital audio data generated at the step 406 to the audio capture component 312.

Subsequently, at a step 408, the audio capture component 312 operates to capture the digital audio data generated at the step 406.

Meanwhile, at a step 410, the sound-generating hardware operates to generate the acoustic audio signals corresponding to the digital audio data, as described earlier.

Beneficially, the audio capture component 312 may operate to capture the digital audio data during the generation of the acoustic audio signals. Accordingly, the steps 408 and 410 may be performed simultaneously.

In addition, the method may include a step at which the digital audio data captured at the step 408 are stored in the memory 202.

Further, the method may include one or more steps at which the digital audio data captured at the step 408 may be uploaded to a remote server and/or shared with other users, as described earlier.

It should be noted here that the steps 402 to 410 are only illustrative and other alternatives can also be provided where one or more steps are added, one or more steps are removed, or one or more steps are provided in a different sequence without departing from the scope of the claims herein.

Embodiments of the present disclosure provide a software or computer program product including machine-readable instructions stored on non-transitory machine-readable data storage media, wherein the machine-readable instructions of the software product are executable upon the computing hardware, such as a processor, of the portable device 200 for implementing the method as described in conjunction with FIG. 4. In one embodiment portable device 200 is generally configured to utilize program storage devices embodying machine-readable program source code that is adapted to cause the apparatus to perform and execute the method steps and processes disclosed herein. The program storage devices incorporating aspects of the disclosed embodiments may be devised, made and used as a component of a machine utilizing optics, magnetic properties and/or electronics to perform the procedures and methods disclosed herein. In alternate embodiments, the program storage devices may include magnetic media, such as a diskette, disk, memory stick or computer hard drive, which is readable and executable by a computer. In other alternate embodiments, the program storage devices could include optical disks, read-only-memory ("ROM") floppy disks and semiconductor materials and chips.

The software product may, for example, be downloadable from a software application store, for example from an "App store", to the portable device 200. The computer program product or software incorporating the processes and method steps incorporating aspects of the disclosed embodiments may be stored in one or more computer systems or on an otherwise conventional program storage device.

Embodiments of the present disclosure can be used for various purposes, including, though not limited to, enabling users to capture digital audio data generated during game-playing, without measurably degrading performance of their portable devices, and facilitating the functionality of capturing the digital audio data, without any requirement to modify applications and/or audio engines, apart from simply including the replacement software products in ABIs of the applications.

Modifications to embodiments of the present disclosure described in the foregoing are possible without departing from the scope of the present disclosure as defined by the accompanying claims. Expressions such as "including", "comprising", "incorporating", "consisting of", "have", "is" used to describe and claim the present invention are intended to be construed in a non-exclusive manner, namely allowing for items, components or elements not explicitly described also to be present. Reference to the singular is also to be construed to relate to the plural.

I claim:

1. An audio apparatus for a portable device, wherein the portable device includes computing hardware coupled to associated data memory, wherein the audio apparatus is configured to execute upon the computing hardware an audio product stored in the data memory to generate digital audio data for sound-generating hardware, the sound-generating hardware being configured to generate acoustic audio signals corresponding to the digital audio data, and wherein the audio product includes a plurality of audio libraries that the audio product is configured to use to respond to one or more function calls to generate the digital audio data, wherein:
   the audio apparatus is configured to host one or more replacement audio products, which are storable in the data memory, and are invoked in operation as an alternative to one or more of the plurality of audio libraries for generating the digital audio data when the audio product is not operable to capture the digital audio data; and wherein
   the audio apparatus is configured to:
     automatically transmit the digital audio data to the one or more replacement audio products and/or override a function call to the audio product and direct the function call to the one or more replacement audio products to
     capture the digital audio data; and
     generate the acoustic audio signals in the sound-generating hardware.

2. The audio apparatus as claimed in claim 1, wherein the audio product comprises a High Level Audio Library (HLAL) and a Low Level Audio Library (LLAL), wherein the HLAL generates instructions for producing the digital audio data, and sends the instructions to the LLAL to generate and send the digital audio data to the sound-generating hardware, and wherein the one or more replacement audio products include a Replacement High Level Audio Library (RHLAL) and a Wrapper Library (WL), wherein the RHLAL is configured to provide Application Programming Interfaces (APIs) that are a functional equivalent to Application Programming Interfaces of the High Level Audio Library, and the wrapper library is configured to override function calls directed to the Low Level Audio Library to pass through the wrapper library prior to the Low Level Audio Library.

3. The audio apparatus as claimed in claim 1, wherein the one or more replacement audio products include an audio capture component for capturing the digital audio data to be stored in the data memory coupled to the computing hardware and regenerate the acoustic audio signals.

4. The audio apparatus as claimed in claim 1, wherein the portable device comprises at least one of: a mobile terminal, a mobile telephone, a smart phone, a Mobile Internet Device (MID), a phablet computer, a tablet computer, an Ultra-Mobile Personal Computer (UMPC), a Personal Digital Assistant (PDA), a web pad, a handheld personal computer, a laptop computer, an interactive entertainment computer, and a gaming terminal.

5. The audio apparatus as claimed in claim 1, wherein the sound-generating hardware includes at least one of an audio driver or audio adapter coupled to at least one audio endpoint of the portable device for generating the acoustic audio signals, wherein the audio driver or audio adapter process the digital audio data and generate acoustic audio signals.

6. The audio apparatus as claimed claim 1, wherein the audio product comprises proprietary software, which is configured in a manner that hinders use of the one or more audio libraries to generate the digital audio data.

7. A method of operating an audio apparatus for a portable device, wherein the portable device includes computing hardware coupled to associated data memory, wherein the audio apparatus is configured to execute upon the computing hardware an audio product stored in the data memory to generate digital audio data for sound-generating hardware, the sound-generating hardware configured to generate acoustic audio signals corresponding to the digital audio data, and wherein the audio product includes a plurality of audio libraries that the audio product is configured to call to generate the digital audio data, wherein the method comprises:
   using the audio apparatus to host one or more replacement audio products, which are storable in the data memory;
   invoking the one or more replacement audio products as an alternative to the one or more audio libraries for generating the digital audio data by one or more of overriding the function call to the audio product or automatically transmitting the digital audio data to the one or more replacement audio products;
   wherein the one or more replacement audio products are configured to capture the digital audio data and the sound-generating hardware is configured to generate the acoustic audio signals corresponding to the digital audio data captured by the one or more replacement audio products.

8. The method as claimed in claim 7, wherein the audio product includes a High Level Audio Library (HLAL) and a Low Level Audio Library (LLAL), wherein the HLAL is configured to generate instructions for producing the digital audio data, and to send the instructions to the LLAL to generate and send the digital audio data to the sound-generating hardware, and wherein the one or more replacement audio products include a Replacement High Level Audio Library (RHLAL) and a Wrapper Library (WL), wherein the RHLAL is configured to provide Application Programming Interfaces (APIs) that are a functional equivalent of an application programming interface of the HLAL, and the WL is configured to override the function calls to the LLAL and direct the function calls to pass through the WL prior to the LLAL.

9. The method as claimed in claim 7, wherein the one or more replacement audio products include an audio capture component for capturing the digital audio data to be stored in the data memory coupled to the computing hardware and used to regenerate acoustic audio signals.

10. The method as claimed in claim 7, wherein portable device comprises at least one of: a mobile terminal, a mobile telephone, a smart phone, a Mobile Internet Device (MID), a phablet computer, a tablet computer, an Ultra-Mobile Personal Computer (UMPC), a Personal Digital Assistant (PDA), a web pad, a handheld personal computer, a laptop computer, an interactive entertainment computer, and a gaming terminal.

11. The method as claimed in claim 7, wherein the sound-generating hardware includes at least one of an audio driver and audio adapter coupled to at least one audio endpoint of the portable device for generating the acoustic audio signals, wherein the audio driver and audio adapter are process the digital audio data and generate acoustic audio signals.

12. The method as claimed in claim 7, wherein the audio product comprises proprietary components that are not operable to capture the digital audio data used by the sound-generating hardware to generate the acoustical audio signals.

13. A computer program product comprising computer readable program code means stored on non-transitory machine-readable data storage media, wherein the computer program product is executable upon computing hardware of a portable device for implementing a method as claimed in claim 7.

14. The computer program product as claimed in claim 13, wherein the computer program product is downloadable from an application store to the portable device.

15. A computer program product for a portable gaming device, the computer program product comprising computer readable program code means stored on non-transitory machine-readable data storage media, the computer program product for the portable gaming device comprising:
computer readable program code means, the computer readable program code means when executed in a processor device being configured to:
generate digital audio data for sound-generating hardware in the portable gaming device, the sound-generating hardware being configured to generate acoustical audio signals corresponding to the digital audio data; and
when an audio product associated with the sound-generating hardware is not operable to capture the digital audio data used by the sound-generating hardware to generate the acoustical audio signals;
automatically transmit the digital audio data to a replacement audio product that is hosted on the portable gaming device and/or override a function call to the audio product and direct the function call to the replacement audio product, the replacement audio product being configured to capture the digital audio data and enable the sound-generating hardware to generate the acoustic audio signals.

16. The computer program product of claim 15, wherein the audio product comprises a High Level Audio Library (HLAL) and a Low Level Audio Library (LLAL), the HLAL being configured to generate instructions for producing the digital audio data, and to send the digital audio data and instructions to the LLAL, the LLAL being configured to generate the digital audio data to the sound-generating hardware to generate the acoustic audio signals.

17. The computer program product of claim 16, wherein the replacement audio product comprises an audio capture device for capturing the digital audio data, a Replacement High Level Audio Library (RHLAL) and a Wrapper Library (WL), the RHLAL configured to provide an application programming interface (APIs) configured to generate instructions for producing the digital audio data, the WL being configured to override function calls to the LLAL to pass through the WL prior to the LLAL.

18. The computer program product of claim 17, wherein the portable gaming device comprises a microphone for capturing sound to generate the digital audio data and acoustic audio signals generated from a loudspeaker of the portable gaming device are captured as other digital audio data in a memory of the portable gaming device.

19. The computer program product of claim 17, the computer program code means, when executed in a processor device being configured to:
determine a type of audio processing required to generate the acoustical audio signals from the digital audio data and a characteristic of the digital audio data; and
automatically call the replacement audio device comprising the RHLAL to process the digital audio data based on the type of audio processing and the characteristic of the digital audio data, wherein the RHLAL provides instructions to the LLAL to pass the digital audio data to the sound-generating hardware and an audio capture device, wherein the sound-generating hardware generates the acoustic audio signals corresponding to the digital audio data.

20. The computer program product of claim 17, the computer program code means, when executed in a processor device being configured to:
determine a type of audio processing required to generate the acoustical audio signals from the digital audio data and a characteristic of the digital audio data; and
automatically call the replacement audio device comprising the WL to call the LLAL to generate the digital audio data to the sound-generating hardware and an audio capture device, wherein the sound-generating hardware generates the acoustic audio signals corresponding to the digital audio data.

* * * * *